Oct. 16, 1951     F. L. BAXTER, JR     2,571,187
LENS MOUNT
Filed Sept. 21, 1950     2 Sheets-Sheet 1
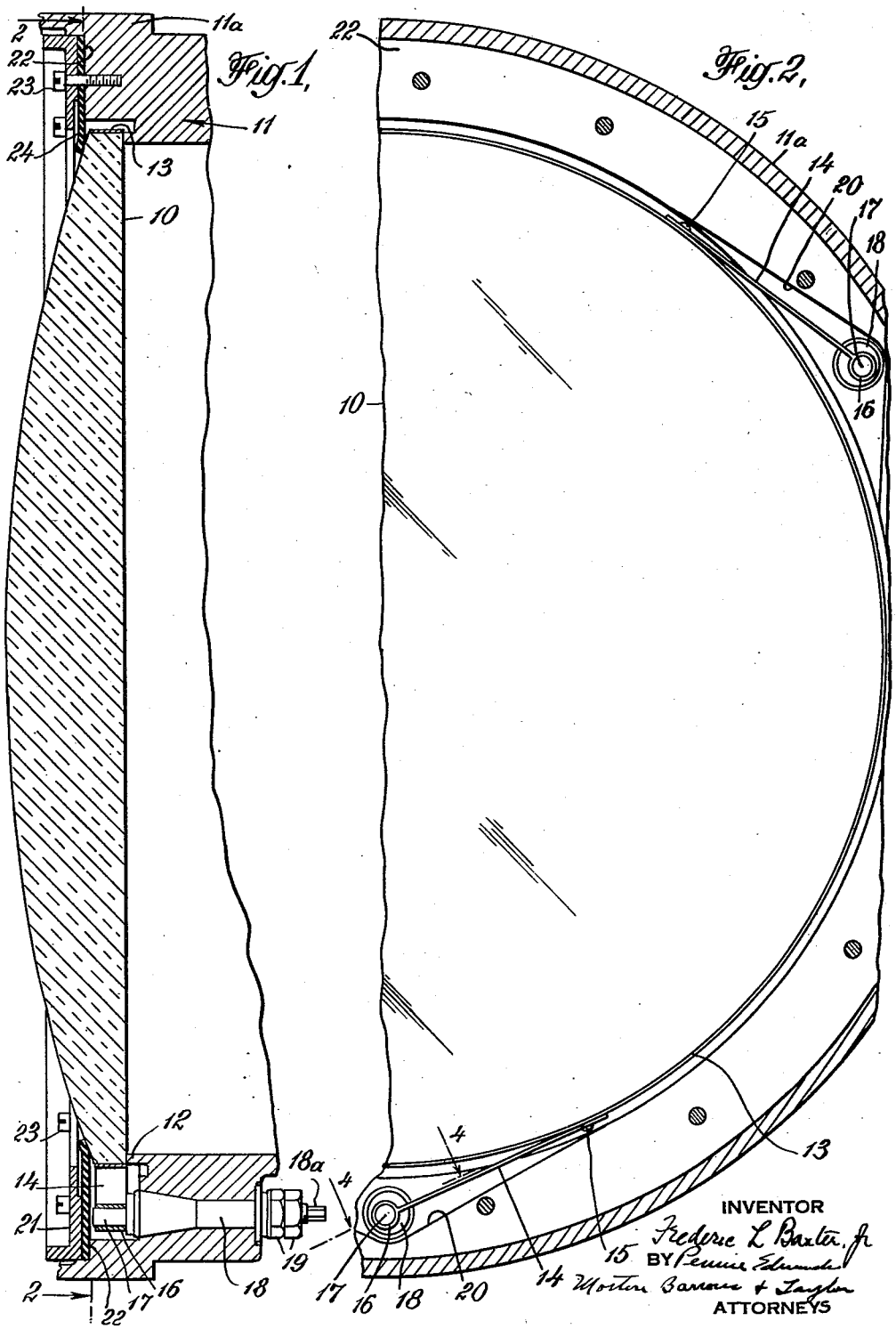

Oct. 16, 1951  F. L. BAXTER, JR  2,571,187
LENS MOUNT
Filed Sept. 21, 1950  2 Sheets-Sheet 2
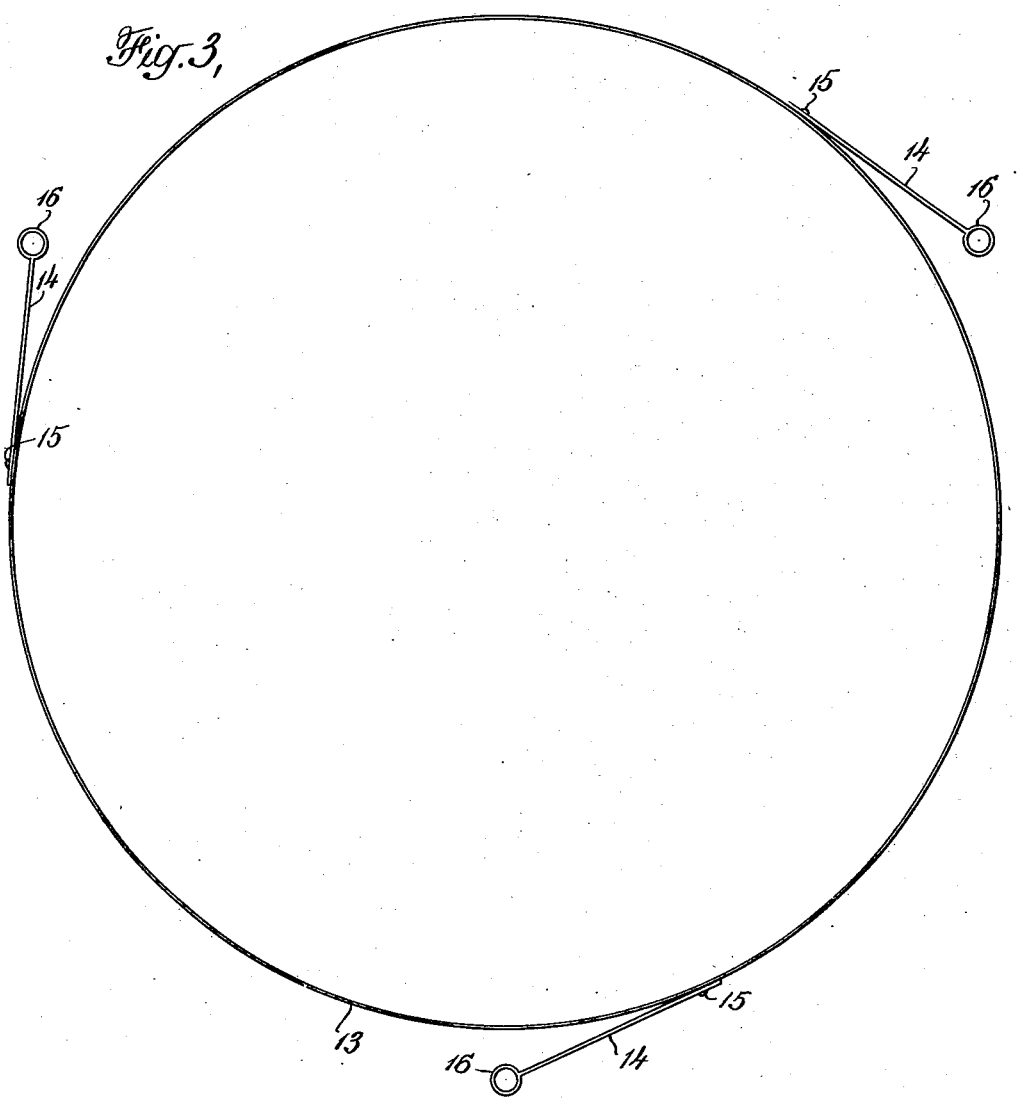
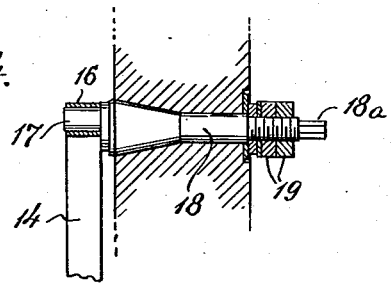
INVENTOR
Frederic L. Baxter, Jr.
BY
ATTORNEYS Patented Oct. 16, 1951

2,571,187

UNITED STATES PATENT OFFICE 2,571,187

LENS MOUNT

Frederic L. Baxter, Jr., New Canaan, Conn., assignor to The Perkin-Elmer Corporation, Glenbrook, Conn.

Application September 21, 1950, Serial No. 186,007

7 Claims. (Cl. 88—57)

This invention relates to mounts for optical elements, such as lenses and mirrors, and is concerned more particularly with a novel mount for an optical element, which facilitates centering the element, holds the element firmly in centered position, even though the assembly is subjected to strong forces, and permits the element to expand and contract freely without altering its centering. The new mount is of simple construction, easy to assemble, and light in weight, and an optical element in the mount is not subjected to localized stresses and need not be slotted or drilled. The new mount is especially adapted for supporting the large elements of lenses used in cameras for aerial photography and, since all the advantages of the invention are realized in that application, a form of the mount suitable for such use will be illustrated and described in detail for purposes of explanation.

In the mounting of the elements of a lens, which is to be exposed to wide variations in temperature, one method commonly used heretofore has involved making the cell for each element of the lens of a metal having a coefficient of thermal expansion as close as possible to that of the glass of which the element is made. Such mounts are open to a number of objections, in that the machining of the cells and the mounting of the elements therein with the desired accuracy are difficult operations and the centering of the elements in their cells usually requires that shims or pads be used. The insertion of such shims or pads between the element and its cell must be done with the utmost care and, even so, may result in the development of excessive differential pressures on the element.

Various other expedients for mounting an optical element in its cell in such manner as to avoid damage to the element as a result of temperature changes have been proposed heretofore, but the prior methods, with which I am familiar, have all been open to objection. Thus, one prior method involves mounting the element on three radial pins or keys spaced equiangularly about the circumference of the element, the pins being attached to the inner wall of the cell and entering openings in the element. In alternative forms of this type of mount, the keys are secured to pins inserted in openings in the edge of the element and enter openings in the wall of the cell, or the keys are cemented to the edge of the element. All such mounts are undesirable because of centering difficulties in the initial assembly and the use of those mounts, which require drilling or slotting of the element, involves the risk of losing the element in the drilling or slotting operation. The mounts, in which keys are cemented to the element, are objectionable because of the uncertain life of the cement and, if the members cemented to the element are not made of a material having the same coefficient of expansion as the glass, excessive stresses are applied to the element at the margins of the cemented areas.

The present invention is directed to the provision of a novel mount for an optical element, which facilitates initial centering of the element and permits the element to expand and contract freely and without damage thereto in response to wide variations in temperature. The new mount includes a thin endless metallic band provided with a plurality of equiangularly spaced members extending tangentially from the band in the same rotational direction. The band is applied with a press fit to encircle the element and is of such dimensions that, at normal temperatures, the band fits the element snugly. The tangential members are metallic and of strip form and have their inner ends secured to the outer surface of the band in any convenient manner, such as by riveting. The outer ends of the strips are then secured to the cell for the element by means holding them tightly against motion lengthwise of the strips while permitting adjustment in that direction. The strips are of such construction that they will support loads applied lengthwise in either tension or compression without significant stretching, compression, or buckling. As a result of the symmetrical arrangement of the strips, the application of a load to the element is resisted by two or more of the strips in tension or compression and without aid from the other strips, which would bend under the load applied. Accordingly, the element is rigidly held in place but is free to expand or contract relative to the cell, since the tangential members have little stiffness radially of the element.

By longitudinally displacing the tangential members, it is possible to shift the center of the element and, if three members are used, the longitudinal adjustment of one member causes the center of the element to move along an arc, the center of which is the intersection of the prolongations of the other two members. Accordingly, the use of three members is preferred, since shifting of the center of the element can be accomplished by adjustment of one member only, whereas, if more than three members are employed, shifting of the center of the element requires simultaneous movement of two members.

For a better understanding of the invention, reference may be made to the accompanying drawings in which:

Fig. 1 is a vertical sectional view through a lens supported in one form of the new mount;

Fig. 2 is a fragmentary sectional view on the line 2—2 of Fig. 1;

Fig. 3 is a plan view of the band forming part of the mount; and

Fig. 4 is a sectional view on the line 4—4 of Fig. 2.

The mount shown in the drawings is for a circular lens element 10 and it includes a cell 11, which may be made of any suitable material and is preferably made of one of the light metal alloys, when the mount is to be used in a camera for aerial photography. The cell has a section 11a which is of larger internal diameter than the element and is provided with a flange 12, against which the lens abuts.

The mount comprises an endless metallic band 13, which is relatively narrow and of such internal diameter that it may be applied with a press fit to encircle the lens. Thereafter, if desired, a thin fluent cement may be applied at the edges of the band to spread evenly by capillarity between the band and lens. The band may be made of a suitable stainless or mild steel and is sufficiently elastic to permit it to stretch, when the band expands because of a temperature rise. At normal temperatures, the band fits the lens snugly and grips the lens somewhat more tightly at temperatures below normal. However, the pressure exerted by the band on the lens at temperatures within limits below normal is not sufficient to cause important distortion of the lens because of the large area of contact of the band with the lens.

Before the band is applied to the lens, a plurality of supporting members 14 are secured at one end to the outer side of the band at equal spacings. The members extend trangentially from the band in the same rotational direction and each member is preferably made of a strip of the same metal as the band and is of about the same width as the band. Each member is secured to the band in any convenient way, as by means of a rivet 15. The outer end of each member is adjustably secured to the cell 11 and, for this purpose, the free end of each member may terminate in a loop 16, in which is snugly received a pin 17 extending eccentrically from the end of a stud 18 lying within a bore in the wall of the cell parallel to the axis of the lens. Adjacent its end carrying the pin, the stud has a portion of tapering diameter and the bore is correspondingly tapered. At its other end, the stud is threaded and carries lock nuts 19 and, when the nuts are taken up, the tapering portion of stud 18 makes a tight fit in the tapered portion of the bore. The end 18a of the stud beyond the nuts is squared, so that, when the nuts are turned back to free the stud, it may be rotated by a tool applied to the squared end. Rotation of the stud causes a movement of the pin resulting in an endwise movement of the member, the loop of which encircles the pin.

In the construction illustrated, there are three strips 14 attached to the band 13 120° apart and the strips are relatively short, so that they will support loads applied lengthwise in either tension or compression without stretching, compression, or buckling of consequence. When the lens is exposed to a temperature change, it may freely expand or contact, since the strips flex freely in a direction radially of the lens. As the strips are identical, expansion or contraction of the lens does not alter the position of the center thereof. The lens may be centered by endwise adjustment of one strip by rotation of the stud to the pin of which the strip is connected. By such endwise shifting of a strip, the lens center moves along an arc but the radius of the arc is so great that the departure from rectilinear movement is negligible.

The outer circumferential wall of section 11a of the lens is cut away to provide recesses 20 for the inner ends of the studs and the supporting strips. Between the studs, the wall of the cell section lies close to the surface of the band but provides enough space for expansion and contraction of the lens under temperature changes.

In order to hold the lens in place against flange 12, a ring 21 is mounted against a radial shoulder 22 at the end of cell section 11a by screws 23 threaded through the ring and into the wall of the cell section 11a between the recesses 20. A gasket 24 is interposed between the ring and the shoulder and the inner edge of the gasket projects inwardly beyond the edge of the ring and bears against the outer face of the lens.

With the construction described, the lens is held rigidly against displacement of its center by the three supporting members and, at the same time, the lens is free to expand or contract in relation to the cell. If desired, more than three members may be used but, in that case, centering of the lens would require simultaneous movement of all but two members by varying amounts, whereas, with three members, centering may be effected by shifting a single member. The application of a load to the mount for example, as a result of vibration, causes movement of the lens to be resisted by two or more of the supporting members acting in tension or compression, while the remaining member or members bend under the load. Since the deformation of the members under tensile or compressive forces is insignificant, the lens is held rigidly by the new mount and maintains its centering, regardless of forces applied to the mount or the expansion or contraction of the lens as a result of temperature change.

I claim:

1. A mount for an optical element, which comprises a cell having a section larger than the element and means at one end of the section adapted to be engaged by one face of the element, an endless metallic band adapted to encircle the element and fit its periphery snugly at normal temperatures, at least three metallic strips, each having an end rigidly secured to the outer surface of the band, the connections of the ends of the strips to the band being equiangularly spaced along the band and the strips extending tangentially from the band in the same rotational direction, and a plurality of means on the cell engaging and holding the outer ends of the respective strips, each of said means being operable independently of the others to shift the strip held thereby endwise to vary the position of the center of an element held within the band.

2. A mount for an optical element, which comprises a cell having a section larger than the element and means at one end of the section adapted to be engaged by one face of the element, an endless metallic band adapted to encircle the element and fit its periphery snugly at normal temperatures, at least three metallic strips, each having an end secured to the outer surface of the band, the connections of the ends of the strips to the band being equiangularly spaced along the band and the strips extending tangentially from the band in the same rotational direction, loops on the outer ends of the strips, and means on the cell entering the loops to anchor the strips and operable to shift the strips endwise to vary the position of the center of an element held within the band.

3. A mount for an optical element, which comprises a cell having a section larger than the element and means at one end of the section adapted to be engaged by one face of the element, an endless metallic band adapted to encircle the element and fit its periphery snugly at normal temperatures, at least three metallic strips, each having an end secured to the outer surface of the band, the connections of the ends of the strips to the band being equiangularly spaced along the band and the strips extending tangentially from the band in the same rotational direction, loops on the outer ends of the strips, and studs mounted for rotation in openings in the cell wall on axes parallel to the axis of the element, each stud having at one end an eccentric pin entering the loop on a strip and the other end of the stud being exposed beyond the cell wall, the rotation of a stud causing endwise movement of its strip.

4. A mount for an optical element, which comprises a cell having a section larger than the element and an internal flange adapted to be engaged on one face by a face of the element, means attached to the flange for holding the element against the flange, an endless metallic band adapted to encircle the element and fit its periphery snugly at normal temperatures, at least three metallic strips, each having an end secured to the outer surface of the band, the connections of the ends of the strips to the band being equiangularly spaced along the band and the strips extending tangentially from the band in the same rotational direction, and means on the cell engaging and holding the outer ends of the respective strips, said means being operable to shift the strips endwise to vary the position of the center of the element held within the band.

5. A mount for an optical element having a peripheral surface, which comprises a cell having a section larger than the element, an endless metallic band adapted to encircle the element and fit its peripheral surface snugly at normal temperatures, the band being relatively thin and narrower than the axial thickness of the element, to which it is to be applied, at least three thin transversely flexible metallic strips, each having an end rigidly secured to the outer surface of the band, the connections of the ends of the strips to the band being equiangularly spaced along the band and the strips extending tangentially from the band in the same rotational direction, and a plurality of means on the cell engaging and holding the outer ends of the respective strips to support the band and the element therein.

6. A mount for an optical element having a peripheral surface, which comprises a cell having a section larger than the element, an endless metallic band adapted to encircle the element and fit its peripheral surface snugly at normal temperatures, the band being relatively thin and narrower than the axial thickness of the element, to which it is to be applied, at least three thin transversely flexible metallic strips, each having an end rigidly secured to the outer surface of the band, the connections of the ends of the strips to the band being equiangularly spaced along the band and the strips extending tangentially from the band in the same rotational direction, and a plurality of means on the cell engaging and holding the outer ends of the respective strips, each of said means being operable independently of the others to shift the strip held thereby endwise to vary the position of the center of an element held within the band.

7. A mount for an optical element having a peripheral surface, which comprises a cell having a section larger than the element, an endless metallic band adapted to encircle the element and fit its peripheral surface snugly at normal temperatures, the band being relatively thin and narrower than the axial thickness of the element, to which it is to be applied, at least three thin transversely flexible metallic strips, each having an end rigidly secured to the outer surface of the band, the connections of the ends of the strips to the band being equiangularly spaced along the band and the strips extending tangentially from the band in the same rotational direction and having loops at their free ends, a plurality of studs, one for each strip, mounted for rotation in openings in the cell wall on axes parallel to the axis of the element, each stud having a portion of tapering diameter received within a similar part of its opening in the cell wall and each stud having an eccentric pin at one end entering the loop of a strip, the other end of the stud being exposed beyond the cell wall, and means on each stud for holding it with its tapering portion tightly drawn into the corresponding part of its opening, each stud being rotatable, when its holding means is inoperative, to cause endwise movement of its strip.

FREDERIC L. BAXTER, JR.

REFERENCES CITED

The following references are of record in the file of this patent:

UNITED STATES PATENTS

| Number | Name | Date |
|---|---|---|
| 1,417,326 | Jacobson | May 23, 1922 |
| 1,876,384 | Arano | Sept. 6, 1932 |
| 2,219,224 | French | Oct. 22, 1940 |
| 2,444,457 | Marks et al. | July 6, 1948 |
| 2,456,053 | Doyle | Dec. 14, 1948 |
| 2,466,331 | Schnable | Apr. 5, 1949 |
| 2,500,405 | Fairbank | Mar. 14, 1950 |